United States Patent Office 2,846,317
Patented Aug. 5, 1958

2,846,317
PRESERVATION OF FOODS

Frederick C. Bersworth, Verona, N. J., and Martin Rubin, Silver Spring, Md., assignors, by direct and mesne assignments, to The Dow Chemical Company, Midland, Mich., a corporation of Delaware No Drawing. Application January 14, 1954
Serial No. 404,129

11 Claims. (Cl. 99—182)

This invention relates to improved fortified foods and a method for the stabilization of foods and, particularly, such foods as contain unsaturated organic compounds subject to deterioration by oxidation or catalytic oxidation attributable to the presence of traces of heavy metals in the foods.

Briefly, any food, such as fruit juice, or fresh food of any kind, may be said to contain an unsaturated organic group, such as that which is characteristic of ascorbic acid, wherein the enediol structure or the conjugation of double bonds may undergo an enolic rearrangement and is subject to oxidative deterioration. Typical of the compounds which contain such systems are ascorbic acid and analogs thereof, such as reductic acid, reductone, oxytetronic acid, hydrated carlic acid, dihydroxy maleic acid, catechol 1,2-dihydroxynaphthalene, etc. Foods when freshly cut for processing undergo some cell destruction with accompanying release of enzymes and progressive deterioration of the food.

It is, accordingly, a fundamental object of this invention to provide a means of protecting systems containing enediols.

It is another object of the invention to provide a means of stabilizing enediol systems by adding thereto certain chemical compositions which are non-toxic in the indicated amounts and can be administered orally or parenterally without ill effect.

It is a further object of the invention to provide a method for protecting enediol systems against catalytic oxidation by metals to keto and quinone systems with elimination of the resulting detrimental effects on the activity of the enediol system.

It is another object of the invention to produce stabilized food preparations which are resistant to catalytic oxidation by metals.

It is still another object of the invention to fortify foods in a manner such that deterioration of the food through enzyme activity released during the processing is avoided.

Inasmuch as ascorbic acid is an important dietary material and is found in a wide variety of foods, it is important that foods, particularly those which are canned, be protected so as to retain a high anti-scorbutic activity, and, accordingly, it is another object of the invention to provide a means for protecting the anti-scorbutic activity of canned foods and particularly to protect them against the catalytic oxidation influence of metal traces which may be incorporated therein during the processing and standing in storage containers.

Other objects will in part be obvious and in part appear hereinafter.

We have found that the incorporation of a small amount of soluble non-metabolizable chelating agent characterized as a polycarboxylic acid polyamino chelating agent which may be represented by the general formula:

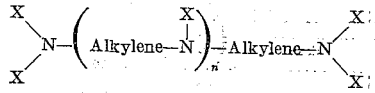

wherein Alkylene is a low molecular weight alkyl group which adds 2 to 3 carbon atoms to the chain between the nitrogen atoms, such as ethylene, propylene, isopropylene, diethyl ether or 1,2-dicyclohexylene; X is an acid substituent such as acetic acid or propionic acid or the alkali metal salts thereof or one and not more than two of the X groups may be ethanol or propanol; and $n$ is an integer from the group 0–4; the said compound being in the form of its calcium chelate and incorporated into the food product to be preserved in amounts ranging from 0.001 percent up to as much as 2 or 3 percent, vastly improves the stability of the product. The value of including the calcium chelate resides in the fact that heavier metals which generally have a deteriorating effect upon the food substances by catalytic oxidation are preferentially chelated by these materials with the release of calcium, which thereby becomes available as a physiological or nutritional calcium material.

To be most useful in the food system, the protective agent should form chelates with the contaminating metals which are of greater stability than the natural chelating agents in the system. It is a characteristic of the family of compounds described that they are synthetic "unnatural" amino acids and form very stable chelates; also, they are not metabolized when ingested.

In use as food stabilizers, therefore, they form a system in which water- or body fluid-soluble chelates of non-toxic nature are present. They are dispersed throughout the system, whether it be vegetable juice, fruit juice, jelly, milk or body fluid. Intimate present contact with dissolved or colloidally present elements is achieved. Reaction with the elements is rapid, if not immediate, for the calcium complex is about the least stable metal complex formed by the agents. In solution, therefore, the contaminating metals are complexed and calcium released.

The usefulness of the chelating agent either as a salt or preferably in the form of a monocalcium chelate in the preservation of foods is best understood by reference to a few specific instances thereof. The precise mechanism by which the chelating agent or the calcium chelate function is not clear, but it may be assumed that the chelating agent has a stabilizing effect on proteins and unsaturated systems either per se or that it accomplishes the stabilization by interfering with natural enzymes which tend to decompose the food product. Within the cycle controlling the enzyme activity there is need for certain traces of heavy metals present in foods, frequently in undetectable amounts. The chelating agent by rendering these metals non-ionic, or removing them from the sphere of enzymatic activity, effectively removes them from solution in the system and thereby stabilizes the food product at a given level. Where the calcium chelate is used, the calcium being rather weakly held by the chelating agents, reaction with heavy metals in physiological form will take place as it removes the heavy metal from combination. In fact, the free chelating agent should not be present in the food to any significant extent, because in a physiological system, that is, after the food has been ingested, presence of excess of the chelating agent in free form in a system containing substantial amounts of calcium could result in the extraction of calcium from the physiological system itself and thereby develop a detrimental decalcification of the body. Accordingly, as a balancing point it is best to incorporate the chelating agent into food products and products which may be ingested in the form of the calcium compound.

Experiments conducted on tomato juice at an elevated temperature, 176° F., to measure the rate of destruction of vitamins in the juice while it is saturated with air, indicated that the ascorbic acid content of the samples fortified with the calcium chelate of ethylenediaminetetraacetic acid and disodium salt was preserved with an efficiency 50 to 100 percent greater than that detected in the unfortified samples. The amount of calcium chelate added was in the range from about 0.01 percent to 2 or 3 percent. In general, the minimum level of the calcium chelate which is needed is that which will be sufficient to react with the known amount of extraneous heavy metal present in the food. Beyond this, an excess of the calcium chelate of about 100 percent is used. Since copper is the most common metal contaminant of foods and the amount present is known usually to a high degree of precision by the control determinations made in studying the food as it is being canned, the preferred method of adding the calcium chelate is to add 2 to 3 times the amount necessary to deactivate the copper.

Some protein solutions also are found to be unstable because of the presence therein of small amounts of metal ion such as copper or silver or similar heavy metals. The precise reason for the gradual decomposition of such solutions is obscure and may be in part a catalytic effect of the metal ion on decomposition of the protein or it may be an enzyme effect. However, here also it is found that the incorporation of a small amount of the calcium chelate in the metal-protein system is useful in extending the stability, or shelf life of the product. Amounts ranging from 0.001 percent to 3 percent by weight are generally adequate to stabilize protein solutions containing trace amounts, or even quite substantial amounts of metal ions.

*Trace metal requirements of plants and animals*

Plant and animal nutrition require the presence of certain heavy metals in trace amounts. A number of metals have been identified as essential in plant and animal metabolism and others have merely been noted as present. Since the plants obtain their metals from soil, precedent to the presence of the metal in the plant it must be found in the soil. The level of metal concentration in any given plant will vary and the following tabulation gives some figures illustrating the concentrations at which certain metals are found in the plants indicated.

| Trace Element | Lowest Value | | Highest Value | |
|---|---|---|---|---|
| | Plant | Concentration [1] | Plant | Concentration [1] |
| Boron | Wheat straw | 7 | Peach leaves | 123 |
| Molybdenum | Caluliflower | 0.1 | Ladino clover | 12 |
| Iron | Onion bulbs | 29 | Rye | 663 |
| Manganese | Sweet corn (seed) | 3 | Pokeberry | 672 |
| Zinc | Red clover | 6 | Lamb's quarter | 281 |
| Copper | Field corn (seed) | 1.8 | Pepper | 19.6 |
| Cobalt | Field corn (seed) | 0.01 | Rye | 0.7 |
| Iodine | Wild carrot | 0.1 | Wild carrot | 5.2 |
| Fluorine | Buckwheat | 9 | Tomato leaves | 76 |

[1] Concentration expressed in p. p. m. of dry weight.

It appears that one of the functions of the metal in the animal system is to participate in the enzyme reaction cycle within the physiological organism. Some of the metals, of course, are necessary for proper enzyme balance or reaction within the living organism, and the disappearance or insfficiency of that metal can upset that balance.

When foods are processed cell rupture occurs and enzymes are released to the atmosphere with the result that progressive deterioration of the food, commencing at the cut surfaces, will occur. This is commonly observed in most of the vegetables which appear on the market, and is manifested through a browning or discoloration of the cut stem. Control of this effect is achieved by control of the enzymes; in turn, this is accomplished through application of the calcium chelate to the cut stems. Thus the cut stems of lettuce, cabbage, celery, broccoli, and like leafy vegetables, are kept from discoloring when they have the disodium calcium ethylenediaminetetraacetic acid applied to the stem either as a powder or in solution.

The following examples illustrate important preservative or inhibitory effects which can be achieved with food products through the incorporation therein of small amounts of calcium chelates of the type indicated.

In the canning of foods, e. g. vegetables, particularly those of light color, the contamination of the foods with small amounts of iron results in a graying or blackening of the product. This is due to the fact that many foods themselves are chelating agents and form certain proteinates with iron during the processing, which proteinates produce the darkening of the color of the product.

We have found that the inclusion of about 250 p. p. m. of a calcium salt of ethylenediaminetetraacetic acid in the food, based on the raw weight, brings about a satisfactory improvementh in its color, for after processing it will retain its original fresh color.

In the processing of tomato juice minor contaminations of the product with copper, which may come from insecticides used on the tomatoes or may come from the actual processing equipment, result in exceptionally accelerated decomposition of the ascorbic acid which may be present. It appears that the action is catalytic due to the metal, or autocatalytic.

The incorporation of the disodium calcium salt of ethylenediaminetetraacetic acid in amounts up to 2 percent completely eliminates this phenomenon for the calcium chelate readily exchanges calcium for the copper in the tomato juice medium and thereby effectively removes the copper from its role as catalyst in the reaction and at the same time provides calcium in the juice for physiological activity.

In employing the disodium calcium salt of ethylenediaminetetraacetic acid or related chelating agents as described the improved aspect of the compound is that it

*Trace metal levels and requirements in soils, plants and animals*

| Element | Soils | | Plants | | Animals | |
|---|---|---|---|---|---|---|
| | Range of Concentration | Required (Aqueous Concentration of Soluble Elements) | Quantities Found (Dry Wgt. Basis), p. p. m. | Minimum Requirement, p. p. m. | Total Amt. Present (Per Kg. Body Wgt., mg. | Daily Requirement |
| (1) Iron | 0.5-5% | Varies widely with pH | 100-1,000+ | | | |
| (2) Manganese | 0.01-0.5% | | 10-200 | 50 | | |
| (3) Zinc | 10-500 p. p. m. | | 10-100 | 25 | | |
| (4) Copper | 1-100 p. p. m. | 0.01 p. p. m. | 2-20 | 10 | | 2 g. per ton of cattle feed. |
| (5) Cobalt | 0.1-50 p. p. m. | none | 0.02-0.2 | none | | None. |
| (6) Boron | 10-200 p. p. m. | | 5-100 | | | Do. |
| (7) Molybdenum | 0.5-5 p. p. m. | 1 part per billion | 0.2-10 | | 0.1-1 | Do. |
| (8) Vanadium | | | | | | 1 p. p. m. in drinking water. |
| (9) Fluorine | 10-500 p. p. m. | none | | | none | 200 p. p. m. in table salt. |
| (10) Iodine | 0-20 p. p. m. | do | | | none | | has been found that synthetic polyamino carboxylic acids of this class are generally non-metabolizable. Accordingly, they pass through the system unchanged and serve as convenient vehicles for bringing reactive metal ions into the system. To gauge the amount to be used in a given food product the formula may be stated, generally, as an amount thereof which would be equivalent to the amount of active divalent metal ion content of the food of the non-alkaline earth varieties, that is, copper, iron, manganese, zinc, cobalt. Trace metals of this type are needed for the enzyme systems which exist in the living plant or organism. Accordingly, basic reaction involved in this method of food preservation and fortification is an interruption of the enzyme activity.

Of the various metals commonly encountered, it may be stated with some degree of certainty that copper, iron, manganese, zince, calcium and cobalt are needed in a plant and they are also the ones which give difficulty through degrading the food. Boron and molybdenum are also commonly present in plants, but usually as anions and, accordingly, they do not enter into the computation of the amount of chelating material needed. The calcium chelate in tying up the metals mentioned is effective only against those metals which form more stable chelates with the agent in which the calcium is introduced. That is, the stability of the metal chelate must be greater than the stability of the corresponding calcium chelate in order that the calcium chelate added to the food may be effective in fortifying it against degradation. Generally, the amount of the calcium chelate added to the food for preservation purposes, therefore, will be at least the amount necessary to complex the metal ions present in the food. To assure effectiveness in accomplishing the result, twice that amount is added and, in general, it will be found that the amount of calcium chelate added will be from about 0.001 of 1 percent to 2 or 3 percent, depending upon the exact nature of the food product being processed.

After the appropriate calcium chelate is incorporated in the food during processing (before or after cooking), it is sealed into the usual "tin-can" containers. We have found uniformly that foods so handled display an improved flavor and enhanced appearance which are attributable to the stabilizing effect of the chelate.

The preformed calcium disodium salts may be given the general structural formula, when $n=0$ and $$X=CH_2COONa$$

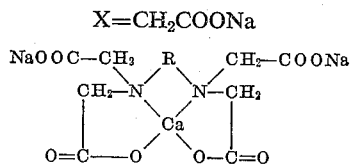

wherein R represents the alkylene radical.

The anti-oxidant action of these chelating agents arises from their ability effectively to remove the contaminating metal ions and thus reduce the effective concentration to a point at which the catalytic activity of the copper is inhibited.

The use of the preformed calcium chelates of ethylenediaminetetraacetic acid, and of diaminoethylethertetraacetic acid and similar compounds, in order to increase the ascorbic acid retention of canned foods and food juices represents the preferred form of this invention. These preformed chelates possess certain advantages in that they are non-metabolizable and innocuous to the system and, in addition to inactivating harmful metals, simultaneously introduce the beneficial metal calcium into the food. The protective influence of these calcium chelates was of the same order of magnitude as that of the other chelating agents. Thus they possess advantages over the other agents in that they may be added to canned foods or food juices in quantities in excess of those required to inactivate any copper present. The food is, therefore, protected against any contamination on prolonged storage and, by adding a small excess of the calcium chelate, the concentration of copper in the food can be kept to a minimum.

In carrying out the objects of the invention the protecting agent is first dissolved in water and then the calculated quantity of aqueous solution of chelating agent, based on the amount of contaminating metal present, is added to the food. The chelating agent may also be added in the solid form if desired. However, the addition of the chelating agent in aqueous solution is easier, more rapid and more accurate than the addition of the solid form.

In copending application Serial No. 300,600, issued January 8, 1957, as United States Patent 2,776,918, it is pointed out that generally the storage and shipment of protein solutions is difficult because they lack stability. This is particularly true when they are packed in metal barrels, but it is apparent that in the packing and storing of any food, or even medicinal product, contamination with metal ions occurs. The most common metal ions to be found in such products will be iron, copper and zinc, but others are quite likely to occur, and stabilization of protein solutions wherein even traces of the metal ions are found becomes important because they have a catalytic effect in inducing hydrolysis of the protein.

It has been found that in the shipment of proteins, stabilization thereof is accomplished when as little as one-half of one percent of the sodium salt of ethylenediaminetetraacetic acid or its calcium chelate is incorporated in the material. For the stabilization of food products containing compounds which will render them subject to deterioration, the incorporation of a calcium chelate therein is effective, and in copending applications Serial Nos. 364,493; 466,664 and Serial No. 216,258, now issued as United States Patent 2,698,823 certain physiological reactions involving the calcium chelates are described, and it is shown that the calcium chelate is tolerated by the system and is non-toxic. In the treatment of food products containing proteins or other materials which are to be stabilized with calcium chelates, it is apparent that the calcium chelate used should be non-toxic in the amounts used, and such has been established with the physiological reactions described.

In certain pasteurization applications, there are problems amenable to solution by the incorporation of the calcium chelating agent in the material. For example, in the pasterurization of whole eggs or egg yolk, the material is heated at 142° F. for 2 minutes. Pasteurization of egg white is carried out at 134° F. for 2 minutes. This treatment will destroy about 90 percent of the bacteria including the pathogenic types.

In the merchandising of eggs, it is found that cracked, soiled, badly packed and other essentially unmarketable types of edible shell eggs can be rendered saleable by freezing the whole egg. Frozen whole egg products at present constitute about 50 percent of the frozen egg market, but the frozen whites and yolks are specialty products which appear to have an increasing demand each year. Presently, it appears that the rate of consumption of frozen eggs is about three hundred million pounds per year. A basic difficulty handicapping the growth of the frozen egg industry is the lack of adequate refrigeration and difficulty in controlling bacterial content. The sources of bacteria are shells, the hands of breakers, and equipment. The yolk and whole egg are contaminated further by the growth of bacteria, for many of the species of bacteria found in frozen eggs multiply at low temperatures during the freezing and defrosting processes. Bacteria may gain entrance to egg products, remain viable for long periods of time and result in possible food poisoning outbreaks.

Since chelating agents of the class herein defined have an anti-coagulating effect on proteins, the calcium chelate or the chelating agent can be added to the product before pasteurization to increase the possible temperature to which eggs can be heated to avoid coagulation, thereby producing complete sterilization of the egg product before refrigeration. The incorporation of the calcium chelate can be brought about by adding the chelating acid or salt to the product, together with a small amount of calcium bicarbonate.

Accordingly, the process of sterilizing eggs is to add to the egg the free chelating agent, heat to sterilizing temperature, and then deactivate the chelating agent by adding an appropriate calcium compound, thereby forming the calcium chelate in the egg. The calcium chelate in the egg then exerts a stabilizing effect against metal degradation.

Similar extension of the anti-coagulating properties of the chelating agents may be brought to the pasteurization of milk or any other product containing protein. That is, the chelating agent having a solubilizing or anti-coagulating effect on proteins may be used as a protective agent during heating operations necessary for sterilization of the product. Accordingly, to add the calcium chelate as a protective means to a system containing protein, add about 0.05 to 0.1 percent of the chelating agent on the basis of the solution and thereafter convert to the calcium chelate following the sterilization operation.

In the preparation of foods and products which are to be ingested or may be ingested, it is advisable that the compound used for the preservation and stabilization of the system be one which is physiologically tolerable by the system. In copending application, Serial No. 216,258, issued as United States Patent 2,698,823, there is described a medicinal preparation consisting of a solution of the sodium salt of the calcium chelate of ethylenediaminetetraacetic acid for use in the heavy metal decontamination of the human body. The same line of compounds is nontoxic when used in foods.

Though the invention has been described in connection with only a few specific examples, it is to be understood that variations thereof may be followed without departing from the spirit or scope of the invention.

What is claimed is:

1. A method of preserving foods in containers comprising incorporating in said food immediately prior to sealing in said container a substantially neutral calcium chelate of a compound corresponding to the following generic formula:

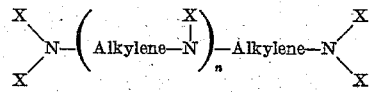

wherein Alkylene is a low molecular weight alkyl group which adds 2 to 3 carbon atoms to the chain between nitrogen atoms; X is selected from the group —$CH_2COOM$, —$CH_2CH_2COOM$, —$CH_2CH_2OH$; wherein M is alkali metal, and not more than two X groups may be —$CH_2CH_2OH$ and are on different nitrogen atoms; $n$ is an integer having a value in the range from 0 to about 4, in an amount at least sufficient to react with metal ions in the food, and thereafter sealing the container.

2. The method in accordance with claim 1, in which the amount of calcium chelate is 0.001 to 3 percent of the raw weight of the food.

3. The method in accordance with claim 2, in which the food is a beverage.

4. The method in accordance with claim 2, in which the food is a vegetable.

5. The method in accordance with claim 2, in which the food is a protein.

6. The method in accordance with claim 2, in which the chelate is disodium calcium ethylenediaminetetraacetic acid.

7. The method in accordance with claim 2, in which the chelate is sodium calcium monoethanolethylenediaminetriacetic acid.

8. The method in accordance with claim 2, in which the chelate is calcium diethanolethylenediaminediacetic acid.

9. The method in accordance with claim 3 in which the chelate is disodium calcium ethylenediaminetetraacetic acid.

10. The method in accordance with claim 3, in which the chelate is sodium calcium monoethanolethylenediaminetriacetic acid.

11. The method in accordance with claim 3, in which the chelate is calcium diethanolethylenediaminediacetic acid.

References Cited in the file of this patent

UNITED STATES PATENTS

| | | |
|---|---|---|
| 2,463,015 | Bersworth | Mar. 1, 1949 |
| 2,686,723 | Chenicek | Aug. 17, 1954 |
| 2,700,612 | Chenicek | Jan. 25, 1955 |
| 2,732,386 | Kuhrt | Jan. 24, 1956 |

OTHER REFERENCES

Martell et al.: Chemistry of Metal Chelate Compounds, Prentice-Hall Inc., New York, N. Y., 1952, page 511.